United States Patent [19]

Zurawski

[11] 4,347,406
[45] Aug. 31, 1982

[54] PULSE DETECTOR CIRCUIT

[75] Inventor: John F. Zurawski, Streamwood, Ill.

[73] Assignee: GTE Automatic Electric Labs Inc., Northlake, Ill.

[21] Appl. No.: 155,699

[22] Filed: Jun. 2, 1980

[51] Int. Cl.³ .................... H04B 1/10; H04Q 3/70
[52] U.S. Cl. .................... 179/18 D; 375/102
[58] Field of Search .......... 179/18 D, 18 EB, 16 AA, 179/175.2 C, 1 MN; 375/102, 104

[56] References Cited

U.S. PATENT DOCUMENTS 3,328,530 6/1967 Schildgen et al. ............ 179/18 EB
3,532,829 10/1970 Wedmore et al. ............... 179/18 D

FOREIGN PATENT DOCUMENTS 278315 4/1966 Australia ........................ 179/18 D
2429533 2/1980 Fed. Rep. of Germany ... 179/18 EB Primary Examiner—Thomas W. Brown
Attorney, Agent, or Firm—Robert J. Black; Gregory G. Hendricks

[57] ABSTRACT

A circuit which detects specific pulses superimposed on noise and other pulse signals. Threshold detecting comparators are used to discriminate between class of service pulses, noise pulses and other supervisory signals.

10 Claims, 1 Drawing Figure

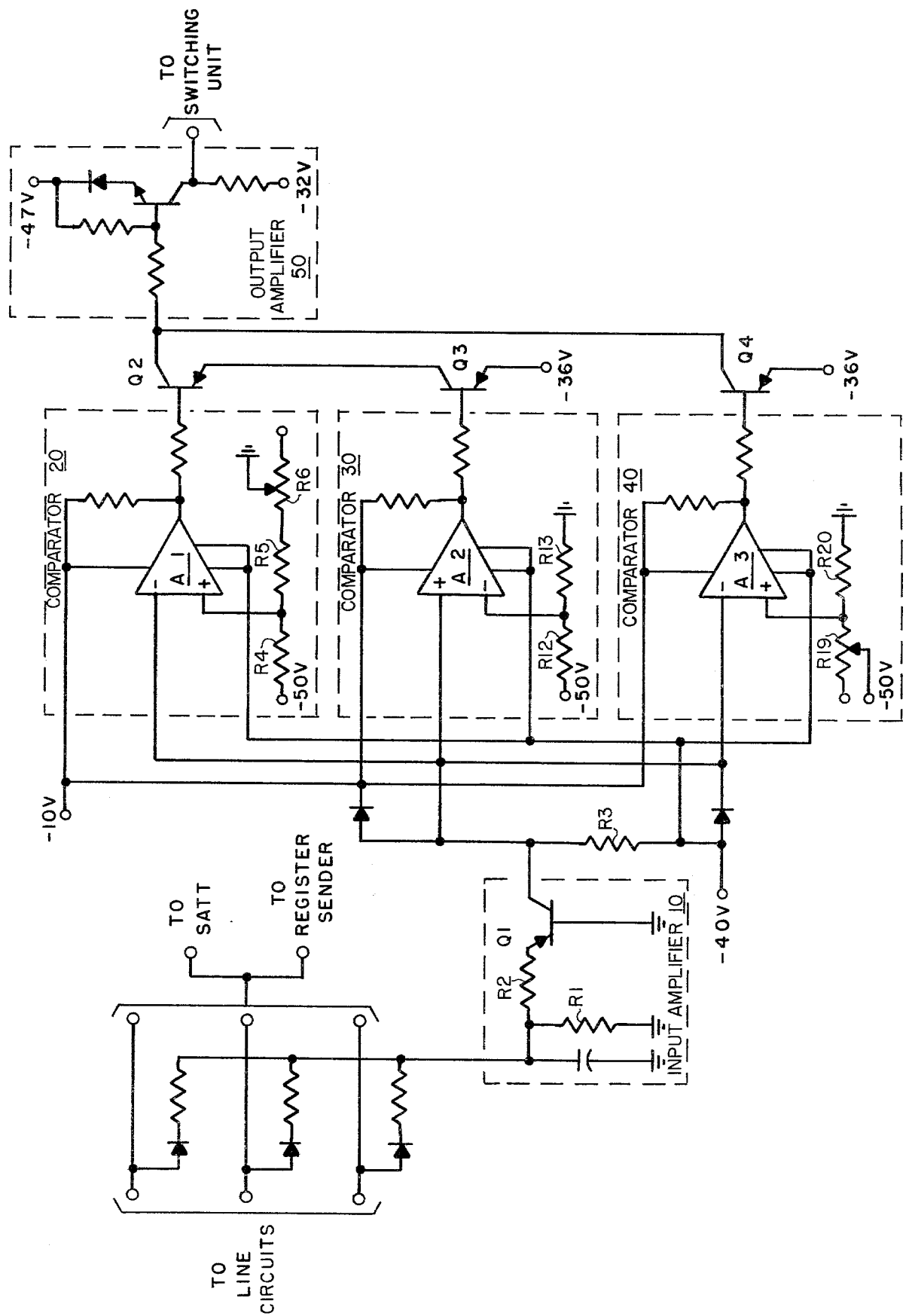

PULSE DETECTOR CIRCUIT

BACKGROUND OF THE INVENTION (1) Field of the Invention

The present invention relates to telephone switching systems and more particularly to a circuit for determining the class of service of a telephone subscriber station.

(2) Description of the Prior Art

The series 100 Director System electronic translator producted by GTE Automatic Electric identifies the class of service of a connected subscriber station through use of a 28 volt, 80 microsecond pulse on the "C" lead of the subscribers line equipment. All subscriber stations are assigned a particular time slot during which their class of service pulse appears. Also, all subscribers of a particular class of service, for example, metro, nonmetro, pay station, dial pulse, touch call, etc., are connected to a particular class of service detector circuit. Thus, when a subscriber station goes off-hook the director system assigns an available register-sender to the subscriber station. The register-sender applies the 28 volt class of service pulse to the subscriber line equipment which is strapped to gate that pulse to the class of service detector associated with the particular class of service of the subscriber station. The director system includes 100 register senders which generate the class of service pulse on a time division basis. Thus, the director system determines the class of service of a particular subscriber station by associating the output signal of a particular class of service detector with the time slot assigned to a particular subscriber station.

A problem experienced with the director system occurs when a Strowger Automatic Toll Ticketing system, also produced by GTE Automatic Electric, is connected to the director system. This SATT system also causes pulses to appear on the "C" lead of a subscriber's line circuit since it applies 60 volt SATT detection battery to the "C" lead for 200 to 300 milliseconds. Thus a class of service detector must be able to distinguish between valid class of service pulses and pulses generated in response to SATT detection battery. Since class of service pulses can be generated in the presence of SATT detection battery the class of service detector must also detect the presence of a valid class of service pulse appearing simultaneously with the SATT detection battery.

The current state of the art for a class of service detector for the series 100 Director System is represented by GTE Automatic Electric's H-840123-A circuit. However this circuit is unable to distinguish between class of service pulses and SATT pulses and thus has a tendency to produce false class of service detection outputs when SATT detection battery is present.

Accordingly it is the object of the present invention to provide a class of service detector circuit which can detect class of service pulses, discriminate between such pulses and SATT pulses, and detect class of service pulses appearing simultaneously with SATT pulses.

SUMMARY OF THE INVENTION

The present invention is a circuit which provides for detection of class of service pulses both during the presence of and in the absence of pulses generated in response to SATT detection battery. This circuit is used in the series 100 Director System.

This circuit consists of an input amplifier connected to associated subscriber stations, to a class of service pulse generator, and to SATT detection equipment. The amplifier is connected to three comparator circuits which are connected to an output amplifier. The three comparator circuits are arranged in such a manner as to allow detection of four different pulse conditions which can appear at the input amplifier. These conditions are: (1) voltages below the class of service pulse threshold, (2) voltages between the threshold of the class of service pulse and the threshold of SATT pulses, (3) voltages between the threshold of SATT pulses and the threshold of the class of service pulse appearing simultaneously with SATT pulses, and (4) voltages above the threshold of the class of service pulse appearing simultaneously with SATT pulses. The comparators are arranged in such a manner as to generate a class of service detection signal only under conditions 2 and 4 since those are the conditions in which the class of service pulse is present either during the absence of or the presence of SATT pulses. No class of service detection signal is required under conditions 1 and 3 since condition 1 represents the absence of both the class of service pulse and the SATT pulse, and condition 3 represents the presence of SATT pulses only. The outputs of the comparator circuits are connected to an output amplifier which converts the class of service detection signals from the various comparators to a signal compatible with the series 100 director system.

The first comparator circuit generates an output signal in response to detection of a class of service pulse, a SATT pulse or a class of service pulse simultaneously appearing with a SATT pulse.

The second comparator is normally operated and generates an output even in the absence of a class of service pulse or an SATT pulse, but it operates to disable the output from the first comparator upon detection of a SATT pulse.

The third comparator circuit operates to generate an output signal in response to detection of a class of service pulse appearing simultaneously with a SATT pulse.

The first and third comparators are connected to the output amplifier via associated switching transistors. The second comparator is connected to a gating transistor which is connected to the output amplifier via the switching transistor associated with the first comparator. This gating transistor operates to disable the output from the first comparator when SATT pulses are detected by the second comparator.

DESCRIPTION OF THE DRAWING

The single FIGURE of the accompanying drawing is a schematic diagram of a pulse detector circuit in accordance with the present invention.

DESCRIPTION OF THE PREFERRED EMBODIMENT

Referring now to the accompanying drawing, the pulse detector circuit of the present invention is shown.

Input amplifier 10 is shown connected to a plurality of subscriber stations each of which is connected to a register-sender associated with the series 100 Director System. These subscriber stations are also connectable to Strowger Automatic Toll Ticketing (SATT) equipment.

Input amplifier 10 includes transistor Q1 connected to resistor R3. Comparator circuit 20 includes amplifier A1 whose positive input is connected to a voltage divider including resistors R4 and R5 and potentionmeter R6. Comparator circuit 30 includes amplifier A2 whose negative input is connected to a voltage divider comprising resistors R12 and R13. Comparator circuit 40 includes amplifier A3 whose positive input is connected to a voltage divider comprising potentionmeter R19, and resistor R20. The outputs of comparators 20, 30 and 40 are connected to transistors Q2, Q3 and Q4 respectively. Transistor Q3 is further connected to transistor Q2 and transistors Q2 and Q4 are both connected to output amplifier 50.

Comparator circuit 20 operates to detect the presence of a class of service pulse generated by the register sender, a SATT detection pulse generated by the SATT equipment, or a class of service pulse appearing simultaneously with a SATT detection pulse.

Comparator 30 is normally operated even in the absence of a class of service pulse or a SATT pulse. However it will turn off upon detection of a SATT pulse or a SATT pulse appearing simultaneously with a class of service pulse.

Comparator 40 operates only upon detection of a class of service pulse appearing simultaneously with a SATT pulse.

The class of service pulse generated by the register sender is a 28 volt, 80 microsecond pulse. However, it appears as a 1-1.8 volt pulse at the input to input amplifier 10. SATT detection battery is a 60 volt signal however it, together with associated interface circuitry, causes a 2.3 volt pulse of 200-300 millisecond duration to appear at the input of amplifier 10. Consequently when a class of service pulse appears simultaneously with a SATT pulse, input amplifier 10 detects a pulse in excess of 3 volts.

Transistor Q1 causes the 1-1.8 volt class of service pulse to appear as a minus 37 volt pulse across resistor R3. Transistor Q1 also causes the 2.3 volt SATT pulse to appear as a minus 21 volt pulse across resistor R3 and it causes a SATT pulse appearing simultaneously with a class of service pulse to appear as a minus 16 volt pulse across resistor R3.

Amplifier A1 is arranged in such a manner as to generate a class of service signal having a voltage more negative than minus 36 volts upon detection of a class of service pulse, a SATT pulse or a SATT pulse appearing simultaneously with a class of service pulse. Since all of these signals are minus 37 volts or more positive than minus 37 volts, the voltage divider connected to the positive input of amplifier A1 is set for a threshold voltage of minus 38 volts. Thus amplifier A1 generates a signal more negative than minus 36 volts in response to each of the three input signals which are all more positive than the threshold applied to the positive input of amplifier A1. If transistor Q3 is turned on, the output signal from amplifier A1 being more negative than minus 36 volts will cause transistor Q2 to turn on and generate a class of service detected signal to output amplifier 50 which converts that signal to a minus 32 volt class of service detected signal for use by the series 100 Director System.

Amplifier A2 is arranged in such a manner as to turn-off, that is, generate an output signal more positive than minus 36 volts, upon detection of a SATT pulse or a SATT pulse appearing simultaneously with a class of service pulse. These two signals are typically minus 21 volts and minus 16 volts, respectively. Therefore, the voltage divider connected to the negative input of amplifier A2 is adjusted to provide a minus 30 volt threshold. Since amplifier A2 turns off upon detection of a signal more positive than the threshold signal connected to the negative input, it generates an output signal more positive than minus 36 volts in response to either a class of service pulse or a class of service pulse appearing simultaneously with a SATT pulse. Consequently, this output signal being more positive than minus 36 volts causes transistor Q3 to turn off, thereby causing transistor Q2 to turn off. Thus, while amplifier A1 will detect the presence of a class of service pulse, a SATT pulse or a SATT pulse appearing simultaneously with a class of service pulse, amplifier A2 will render the output of amplifier A1 inoperative except for the condition of detection of the class of service pulse alone.

Amplifier A3 operates to generate a signal more negative than minus 36 volts upon detection of an input signal more positive than the threshold connected to the positive input of amplifier A3. Since amplifier A3 operates to detect the presence only of a class of service pulse appearing simultaneously with the SATT pulse which is represented by a minus 16 volt signal, the voltage divider connected to the positive input of amplifier A3 is adjusted to provide a threshold of minus 17 volts. Since the class of service pulse appearing simultaneously with the SATT pulse is then more positive than the positive input of amplifier A3, the output signal being more negative than minus 36 volts causes transistor Q4 to turn on and generate a class of service signal of minus 36 volts which is converted to a minus 32 volt class of service detected signal by output amplifier 50 for use by the series 100 Director System.

Thus, the present invention allows detection of a class of service pulse appearing during the presence of, or absence of, an SATT detection pulse. Class of service signals generated by detection of SATT pulses are eliminated. While amplifier A1 detects the presence of a class of service pulse, an SATT pulse or an SATT pulse appearing simultaneously with a class of service pulse, amplifier A2 renders the output of amplifier A1 inoperative upon detection of an SATT pulse or an SATT pulse appearing simultaneously with a class of service pulse. Therefore the combination of amplifiers A2 and A1 generates a class of service detected signal only in response to detection of a class of service pulse appearing during the absence of an SATT pulse. Amplifier A3 however detects the presence of a class of service pulse appearing simultaneously with an SATT pulse.

It will be obvious to those skilled in the art that numerous modifications of the present invention can be made without departing from the spirit of the invention which shall be limited only by the scope of the claims appended hereto.

What is claimed is:

1. A pulse detection circuit for use in a telephone switching system, including a line circuit means operated to provide class of service pulses and supervisory signal pulses, said pulse detection circuit comprising:

first detection means connected to said line circuit means, operated to generate a first class of service detection signal in response to detection of each of said class of service pulses appearing during the absence of said supervisory signal pulses; and second detection means connected to said line circuit means, operated to generate a second class of service detection signal in response to detection of each of said class of service pulses appearing during the presence of said supervisory signal pulses.

2. A pulse detection circuit as claimed in claim 1, wherein there is further included:
first amplifying means connected to said line circuit means and said first and second detection means, operated to amplify said class of service pulses and said supervisory signal pulses;
said first detection means operated in response to said amplified class of service pulses and said second detection means operated in response to said amplified class of service pulses appearing during the presence of said amplified supervisory signal pulses.

3. A pulse detection circuit as claimed in claim 1, wherein there is further included:
amplifying means connected to said first and second detection means, operated to generate a buffered class of service detection signal in response to said first and second class of service detection signals.

4. A pulse detection circuit as claimed in claim 1, wherein said first detection means comprises a first comparison circuit operated to generate a first comparison signal in response to detection of each of said class of service pulses, each of said supervisory signal pulses, each of said class of service pulses appearing simultaneously with said supervisory signal pulses.

5. A pulse detection circuit as claimed in claim 4, wherein said first detection means further comprises a second comparison circuit operated to generate a second comparison signal in response to each of said supervisory signal pulses appearing during the absence of said class of service pulses, said second comparison circuit further operated to generate said second comparison signal in response to each of said supervisory signal pulses appearing during the presence of said class of service pulses.

6. A pulse detection circuit as claimed in claim 5, wherein said first detection means further comprises:
gating means connected to said first and second comparison circuits, operated in response to said first comparison signal and the absence of said second comparison signal to generate said first class of service detection signal;
said gating means further operated in response to said second comparison signal to inhibit said first class of service detection signal.

7. A pulse detection circuit as claimed in claim 4, wherein said first comparison circuit comprises a first amplifier including a positive input and a negative input; and
a voltage divider connected to said positive input, effective to provide a threshold signal, said negative input connected to said line circuit means, said first amplifier operated to generate said first comparison signal in response to each of said class of service pulses having an amplitude above said threshold, each of said supervisory signal pulses having an amplitude above said threshold, or each combination of said class of service pulses appearing simultaneously with said supervisory signal pulses, said combination having an amplitude above said threshold.

8. A pulse detection circuit as claimed in claim 5, wherein said second comparison circuit comprises a second amplifier including a positive input and a negative input; and
a voltage divider connected to said negative input, effective to provide a threshold signal, said positive input connected to said line circuit means, said second amplifier operated to generate said second comparison signal in response to each of said supervisory signal pulses having an amplitude above said threshold signal, or each combination of said supervisory signal pulses appearing simultaneously with said class of service pulses, said combination having an amplitude above said threshold signal.

9. A pulse detection circuit as claimed in claim 1, wherein said second detection means comprises an amplifier, including a positive input and a negative input; and
a voltage divider connected to said positive input, effective to provide a threshold signal, said negative input connected to said line circuit means, said amplifier operated to generate said second class of service detection signal in response to each combination of said class of service pulses appearing simultaneously with said supervisory signal pulses, said combination having an amplitude above said threshold.

10. A pulse detection circuit as claimed in claim 9, wherein said second detection means further comprises gating means connected to said amplifier, operated to gate said second class of service detection signal.

* * * * *

UNITED STATES PATENT OFFICE
CERTIFICATE OF CORRECTION

PATENT NO. : 4,347,406
DATED : August 31, 1982
INVENTOR(S) : John F. Zurawski

It is certified that error appears in the above-identified patent and that said Letters Patent are hereby corrected as shown below:

Column 5, line 24, "each of" should be --or each of--

Signed and Sealed this

Twenty-sixth Day of October 1982

[SEAL]

Attest:

GERALD J. MOSSINGHOFF

Attesting Officer    Commissioner of Patents and Trademarks